United States Patent [19]

Nozik

[11] 4,011,149
[45] Mar. 8, 1977

[54] PHOTOELECTROLYSIS OF WATER BY SOLAR RADIATION

[75] Inventor: Arthur Jack Nozik, Summit, N.J.

[73] Assignee: Allied Chemical Corporation, Morris Township, N.J.

[22] Filed: Nov. 17, 1975

[21] Appl. No.: 632,557

[52] U.S. Cl. .................. 204/129; 136/89 AC; 204/278; 204/192 R

[51] Int. Cl.$^2$ .............. C25B 1/04; H01L 31/04

[58] Field of Search .......... 204/129, 278; 250/527; 136/89

[56] References Cited

UNITED STATES PATENTS

| | | | |
|---|---|---|---|
| 3,271,198 | 9/1966 | Winogradoff et al. | 136/89 |
| 3,628,017 | 12/1971 | Lerner | 136/89 X |
| 3,925,212 | 12/1975 | Tchernev | 250/527 |

OTHER PUBLICATIONS

J. Keeney et al., "Electricity From Photosensitization of Thanium," *Nature*, vol. 253, No. 5494, pp. 719-720 (Feb. 1975).

S. N. Paleocrassas, "Photocatalytic Hydrogen Production: A Solar Energy Conversion Alternative?," *Solar Energy*, vol. 16, pp. 45–51 (1974).

F. Möllers et al., "On the Origin of the Photocatalytic Deposition of Noble Metals on $TiO_2$," *J. Electrochem. Soc.*, vol. 121, pp. 1160–1167 (1974).

K. L. Hardee et al., "Semiconductor Electrodes," *J. Electrochem. Soc.*, vol. 122, pp. 739–742 (1975).

A. Fujishima et al., "Electrochemical Photolysis of Water At a Semiconductor Electrode," *Nature* vol. 238, pp. 37–38 (1972).

*Primary Examiner*—John H. Mack
*Assistant Examiner*—Aaron Weisstuch
*Attorney, Agent, or Firm*—David W. Collins; Ernest A. Polin

[57] ABSTRACT

Photoelectrolysis of water by solar radiation to produce hydrogen is achieved using semiconducting thin film electrodes. The cell comprises (a) an electrode comprising at least one thin film semiconducting layer disposed on a substrate, each layer having a bandgap which ranges from about 1.3 to 4.0 eV; (b) a counter-electrode; (c) an electrolyte disposed between the thin film semiconducting electrode and the counter-electrode; (d) external bias means between the electrode for biasing the electrode with from 0 to about 1 V; and (e) means for collecting hydrogen produced.

23 Claims, 5 Drawing Figures

PHOTOELECTROLYSIS OF WATER BY SOLAR RADIATION

BACKGROUND OF THE INVENTION

1. Field of the Invention

The invention relates to the production of hydrogen and oxygen by the electrolysis of water and, more particularly, to the production of hydrogen by the photoelectrolysis of water using solar radiation.

2. Description of the Prior Art

Two areas that have recently received considerable attention are solar energy conversion and the use of hydrogen as the ultimate fuel for the distribution and interconversion of energy (the hydrogen economy). A coupling of solar energy conversion with the hydrogen economy may produce a solution to both energy resource depletion and environmental pollution problems. Such a coupling may be effected by photolysis, in which sunlight is used to directly decompose water into hydrogen and oxygen. Preferably, semiconductor electrodes may be employed to facilitate photolytic decomposition by a process known as photoelectrolysis. A simple model for such a process can be described in terms of conventional photovoltaic devices which comprise an n-p junction. In photoelectrolytic devices, the n-p junction is replaced by an n-electrolyte-p (or metal) junction. Electron-hole pairs are generated by the absorption of light in either or both semiconductor electrodes. The electron-hole pairs are separated by the semiconductor-electrolyte junction barrier and are injected at the respective electrodes to produce electrochemical oxidation and reduction reactions.

For an n-type electrode, holes combine with hydroxyl ions ($OH^-$) to produce an anodic oxidation reaction; the reverse process occurs at a p-type or metal electrode where electrons combine with protons ($H^+$) to produce a cathodic reduction reaction. The net effect is a flow of electrons from the n-electrode to the p-electrode resulting in reduction at the latter ($H_2$ formation) and oxidation at the former ($O_2$ formation).

Previous work reported in the literature has centered on the electrochemical behavior of illuminated semiconductor single crystal electrodes, such as $TiO_2$, GaAs, ZnO, CdS and ZnSe, to produce hydrogen; see, e.g., Vol. 16, *Solar Energy*, pp. 45–51 (1974) and Vol. 238, *Nature*, pp. 37–38 (July 7, 1972). Preliminary investigations on thin film $TiO_2$ electrodes have also been reported; see, e.g., Vol. 121, *Journal of Electrochemical Society*, pp. 1160–1167 (1974) and Vol. 122, *Journal of Electrochemical Society*, pp. 739–742 (1975). Practical cell configurations, however, are not disclosed.

The attractiveness of photoelectrolysis is that it solves the energy storage problem which plagues the practical implementation of solar energy conversion, and at the same time it has the potential for providing an inexpensive source of hydrogen. However, the current use of single crystal electrodes, which are inherently expensive, and economic considerations relating to other aspects of the cell design, limit its current use. New and more efficient cell designs and materials are required in order to realize the potential of photoelectrolysis.

SUMMARY OF THE INVENTION

In accordance with the invention, a photoelectrolysis cell for producing hydrogen from solar radiation comprises (a) an electrode comprising at least one thin film semiconducting layer, which is disposed on a supporting substrate, each layer having a bandgap which ranges from about 1.3 to 4.0 eV, (b) a counter-electrode, (c) an electrolyte disposed between the thin film semiconducting electrode and the counter-electrode, (d) external bias means between the electrode and the counter-electrode for biasing the electrode with from 0 to about 1 V, and (e) means for collecting the hydrogen produced.

The thin film semiconducting electrode may be either polycrystalline, having a crystallite size ranging from about 25 A to 1 mm, or amorphous. Preferred materials include suitably doped $TiO_2$, $In_2O_3$, $SnO_2$, GaAs, GaP, CdS, Si and the titanates $MTiO_3$, where M is at least one element of barium, strontium, the rare earth elements and the transition metal elements.

Graded bandgaps or multiple heterojunction semiconducting layers may be used to more effectively utilize a larger portion of the solar spectrum.

The counter-electrode may be either metallic or at least one thin semiconducting film disposed on a supporting substrate. If the counter-electrode is metallic, the electrode may comprise either n-type material, such as at least one of the preferred materials given above, or p-type material, such as suitably doped GaAs, GaP, CdTe, $CuInS_2$, InP, ZnSe, $Cu_2S$ and Si. If the counter-electrode is semiconducting, the thin semiconducting film of the counter-electrode has a conductivity type opposite to that of the thin film semiconducting layer(s) of the electrode. Further, the total bandgap for all photoactive layers of both electrodes ranges from about 1.3 to 5.0 eV. Simultaneous illumination of both semiconducting electrodes permits use of a larger portion of the solar spectrum and hence increased conversion efficiency.

The electrolyte may be either liquid or solid having a specific conductivity at least about $10^{-3}$ $ohm^{-1}$-$cm^{-1}$. Liquid electrolytes may be either acidic or basic. Solid electrolytes may comprise cationic or anionic polymeric membrane films, such as perfluorosulfonic acid polymer (also known as Nafion, a trademark of E. I. DuPont de Nemours and Co.) For the case of a solid polymer electrolyte, porous n- and p-type thin semiconducting films comprising the anode and cathode, respectively, of the photoelectrolysis cell are disposed on opposite sides of the polymer electrolyte film, resulting in a totally thin film cell with low internal resistance and, hence, high conversion efficiency of solar energy into hydrogen. Either semiconductor electrode may also be replaced by a porous, thin film metal electrode. The use of n- and p-type electrodes also permits simultaneous illumination of both anode and cathode, resulting in greater conversion efficiency.

Photosensitive dyes may also be incorporated in the electrolyte to sensitize wide bandgap electrodes to longer wavelength radiation and thereby increase the conversion efficiency of cells utilizing such electrodes.

DETAILED DESCRIPTION OF THE INVENTION

1. Basic Considerations

Figure 1:
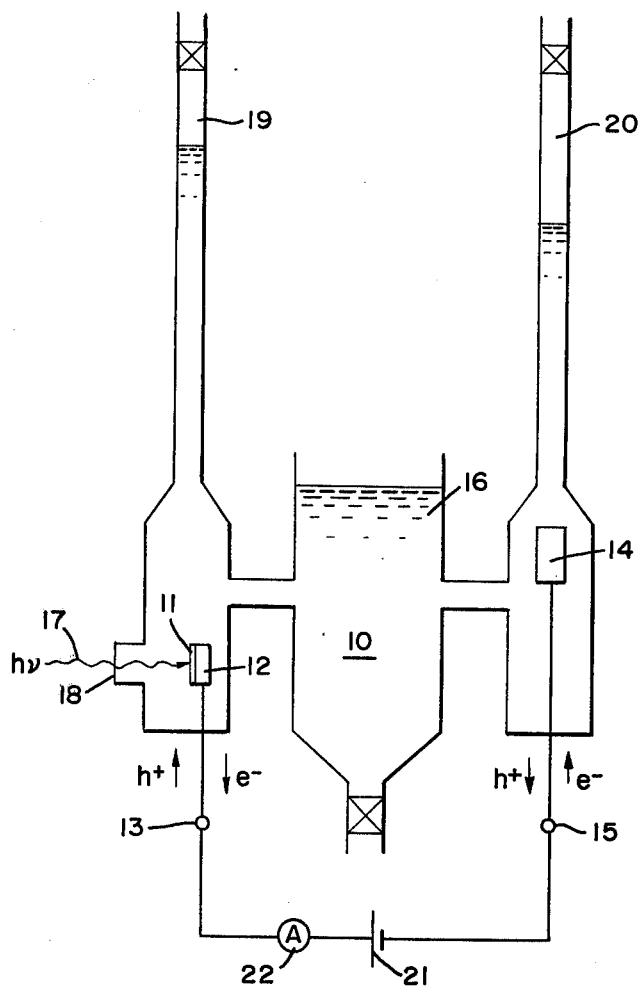
FIG. 1 is a partly schematic and partly diagrammatic view of apparatus useful in the practice of the invention.

Photoelectrolysis is defined as a process whereby light absorbed in one or both electrodes of an electrochemical cell generates electron-hole pairs which are separated and injected into the electrolyte at the cathode and anode, respectively, to produce reduction and oxidation reactions. Hence, an overall photochemical reaction is achieved in two steps: (1) the electrons (and holes) are first created by photoexcitation of a semiconductor electrode, and (2) the electrons (and holes) drive chemical reactions in an electrochemical cell. Of prime importance is the possibility that this sequence can drive reactions at lower energy levels than can either direct photolysis or electrolysis acting independently.

The photoelectrolysis of water is governed by the following process:

$$H_2O(l) \rightarrow H_2(g) + \tfrac{1}{2} O_2(g) \tag{1}$$

$\Delta H° = + 68.32$ kcal/mole (2.96 eV)
$\Delta F° = + 56.69$ kcal/mole (2.46 eV)

For the normal, that is, homogeneous, photolysis of $H_2O$, light with wavelengths less than 2420 A (5.1 eV) is required. This is because the first step in this reaction path involves electronic excitation of the water molecule to high-lying molecular orbitals; absorption of light by water is not appreciable at wavelengths above about 2500 A. However, the maximum photon energy available from the sun (at air mass two) is 4.0 eV, which corresponds to a wavelength of about 3200 A. Hence, direct homogeneous photolysis of water by sunlight is not possible. The actual spectral distribution of solar irradiance is shown in Table I.

Table I.

| Wavelength Interval, A | Photon Energy Interval, eV | Percent Solar Engergy (at air mass two*) |
|---|---|---|
| 3200–4000 | 4.0–3.1 | 2.8 |
| 4000–5000 | 3.1–2.5 | 12.7 |
| 5000–6000 | 2.5–2.1 | 15.4 |
| 6000–7000 | 2.1–1.8 | 15.1 |
| 7000–8000 | 1.8–1.6 | 13.3 |
| 8000–9000 | 1.6–1.4 | 7.7 |
| 9000–10,000 | 1.4–1.2 | 4.4 |
| 10,000–25,000 | 1.2–0.5 | 29.0 |

*Air mass two is defined as the solar energy per unit area impinging on the earth's surface when the sun is 60° from its zenith.

For the normal electrolysis of liquid water, the theoretical decomposition potential is 1.23 eV. In a photoelectrolysis cell, the upper wavelength limit that can be used to decompose $H_2O$ is $12,400/1.23 = 10,000$ A. This value is derived by considering the absorption of two photons in the cell at $h\nu = 1.23$ eV. The two electron-hole pairs provide the two Faradays at 1.23 eV required to satisfy the free energy requirements of reaction (1). The remaining 0.5 eV needed to satisfy the difference between the chemical energy created ($\Delta H$) and electrical free energy ($\Delta F$) used is provided by heat loss from the surroundings. Thus, photoelectrolysis may be viewed as a two-photon process which sensitizes the photolysis of water to visible light.

The details of the photoelectrolysis scheme can best be discussed within the framework of the theory of p-n junctions, Schottky barriers, and the photovoltaic effect. The photoelectrolysis cell can be visualized as an n-p or semiconductor-metal junction which is split and electrolyte interposed between the halves. As a result, one forms either a n-electrolyte-p or semiconductor-electrolyte-metal sandwich.

At the n-type electrode, hydroxyl anions (OH⁻) combine with holes ($h^+$) to product oxygen and water:

$$2h^+ + 2OH^- \rightarrow \tfrac{1}{2} O_2 + H_2O \tag{2}$$

At the p-type or metal electrode, protons ($H^+$) combine with electrons ($e^-$) to produce hydrogen:

$$2e^- + 2H^+ \rightarrow H_2 \tag{3}$$

In an aqueous electrolyte, reactions (2) and (3) occur at the same time. Incoming radiation $h\nu$ (h is Planck's constant, $6.62 \times 10^{-27}$ erg sec, and $\nu$ is the frequency of the radiation in sec$^{-1}$) must be equal to or greater than the bandgap energy $E_g$ in order to generate electron-hole pairs.

Absorption of bandgap light ($h\nu > E_g$) in the n-electrode results in electron-hole pairs which separate in the space charge layer at the surface of the electrode. Hole injection proceeds into the electrolyte, while the electron moves into the bulk of the electrode and around the external circuit to the cathode (counterelectrode). An analagous process occurs when bandgap light is absorbed in a p-electrode. These processes occur at the respective electrodes independently, either with simultaneous illumination or with only one electrode illuminated. Either semiconducting electrode can also be replaced by a metallic electrode.

If the system consists of a semiconductor-electrolyte-metal sandwich, then the bandgap of the semiconductor must be sufficiently high to provide the energy to drive the photolytic reaction and to overcome other energy losses. The minimum bandgap consistent with these considerations is about 1.3 eV. If the system consists of a n-electrolyte-p semiconductor sandwich, then the sum of the bandgaps of the two electrodes must be equal to the above-mentioned minimum energy. For the latter case, it is thus possible to greatly increase the conversion efficiency of solar radiation by simultaneous illumination of n- and p-electrodes of smaller bandgaps, since smaller bandgap semiconductors absorb more light and hence provide higher conversion efficiency.

These considerations can be put into quantitative terms by making an energy balance for the absorbed photon. If one considers the Schottky analog for the photoelectrolysis cell, then for bandgap photons ($h\mu > E_g$) absorbed, for example, in a cell comprising a $TiO_2$ semiconducting electrode and a platinum metal counter-electrode:

$$E_g = V_B + \Delta G/2F + V_H + iR + (E_c - E_f) + \eta_{Pt} + \eta_{TiO_2} \tag{4}$$

where $E_g$ is the bandgap of the semiconductor (3.0 eV for $TiO_2$), $V_B$ the $TiO_2$-electrolyte junction potential barrier (about 0.8 eV), $\Delta G/2F$ is the free energy per electron for $H_2O$ decomposition (1.23 eV), $V_H$ is the drop across the Helmholtz layer of the electrolyte (approximately 0.05 eV), iR is the ohmic loss in the system, $(E_c-E_f)$ is the energy difference between the conduction band and the Fermi level in $TiO_2$ (about 0.2 eV) and $\eta_{pt}$ and $\eta_{TiO_2}$ are the respective electrode overpotentials (approximately 0.1 eV for Pt). The estimate for the potential barrier $(V_B)$ is determined from a Schottky-Mott plot of $1/C^2$ vs $E_b$, where C is the depletion layer capacitance and $E_b$ is an applied bias. Values indicated for the other terms in Equation (4) are either well-known or have been calculated from basic considerations. All the terms on the right-hand side of equation (4) except for $\eta_{TiO}$ add up to about 2.3 eV. This leaves about 0.7 eV that can be tolerated as overpotential for the $TiO_2$ electrode. It is observed that $H_2$ evolution cannot be achieved with $TiO_2$ electrodes unless an anodic bias of about 0.3 to 0.5 volts is provided. This means that the total electron energy input is 3.3 to 3.5 eV and that the overvoltage at the $TiO_2$ electrode is about 0.9 to 1.1 eV. The $O_2$ overvoltage at the $TiO_2$ electrode arises from kinetic limitations on the rate of hole injection from the $TiO_2$ space charge layer into the Helmholtz layer. The theory of this process is not yet understood. It is possible, however, to reduce this overvoltage, for example, by employing other electrode materials, such as CdS or GaP.

Another way to eliminate the need for an external bias in order to generate $H_2$ in the cell is to use the n-electrolyte-p configuration with simultaneous illumination of both electrodes. When n-type $TiO_2$ is employed as the anode, the bandgap of the p-type electrode would have to be greater than about 0.5 eV in order to achieve decomposition of water.

A major feature of photoelectrolysis is the fact that the potential barrier is created by a semiconductor-electrolyte junction. Such junctions exhibit the following significant differences compared to a solid-state junction.

1. The presence of surface recombination sites does not produce deleterious effects on optical conversion efficiency. This is because in photoelectrolysis the annihilation of photoinduced carriers at the surface is precisely their desired fate; these recombination processes result in the relevent electrochemical oxidation and/or reduction reactions. This means that polycrystalline electrodes with grain boundries producing a large source of surface recombination centers should yield conversion efficiencies comparable to single crystal electrodes. In photoexcited solid-state p-n junctions, surface recombination is strictly deleterious, and polycrystalline junctions yield much lower optical conversion energies than single crystal junctions.

2. The reverse saturation current of the junction is equal to the exchange current of the electrochemical reaction occurring at the electrode and may be much less than the limiting diffusion current of minor carriers. For a p-n junction:

$$I_j = I_0 (\text{Exp}(qV/kT)-1) \tag{5}$$

where $I_j$ is the junction current, $I_0$ is the reverse saturation current and $V$ is the junction voltage. For a solar cell (constant current source, $I_s$, in parallel with a p-n junction and a load $R_1$), the maximum efficiency increases with decreasing $I_0/I_s$. At a semiconducting-electrolyte junction, the i-V characteristic is described by an analogous equation, and the lower $I_0$ value resulting from the electrical chemical exchange current leads to higher theoretical conversion efficiencies for photoeffects.

2. Cell Configuration

In accordance with the invention, a photoelectrolysis cell for producing hydrogen from solar radiation comprises (a) an electrode comprising at least one thin film semiconducting layer which is disposed on a supporting substrate, each layer having a bandgap which ranges from about 1.3 to 4.0 eV; (b) a counter-electrode; (c) an electrolyte disposed between the thin film semiconducting electrode and the counter-electrode; (d) external bias means between the thin film semiconducting electrode and the counter-electrode for biasing the thin film semiconducting electrode with 0 to about 1 V, and (e) means for collecting hydrogen produced.

An example of a cell configuration of the invention is shown in FIG. 1. A cell, generally indicated at 10, comprises an electrode 11 comprising at least one thin film semiconducting layer supported on electrically conducting substrate 12, which is connected to anode lead 13, and a counter-electrode 14, which is connected to cathode lead 15. An electrolyte 16 is disposed between the two electrodes. Incoming radiation $h\mu$, shown by arrow 17, enters the cell through transparent window 18, e.g., quartz, and illuminates the semiconducting electrode. The incoming radiation initiates injection of holes into the electrolyte from the anode and electron $(e^-)$ movement from the anode lead to the cathode lead through the external circuit. The holes react with $OH^-$ ions at the surface of the semiconducting electrode to produce oxygen and water (reaction (2) above). The oxygen is collected in space 19. The electrons react with $H^+$ ions at the surface of the counter-electrode to produce hydrogen (reaction (3) above), which is collected in space 20. A conventional bias supply 21, possibly together with an ammeter 22, completes the electrical circuit.

Figure 2:
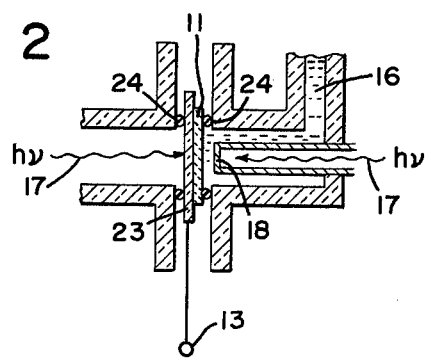
FIG. 2 is a cross-sectional view of an alternate configuration of a portion of the apparatus of FIG. 1.

A portion of an alternative configuration of the thin film semiconducting electrode is shown in FIG. 2. This configuration reduces the pathlength of incoming radiation 17 by placing the transparent window 18 close to the surface of the thin film semiconducting electrode 11. Or, supporting the semiconducting electrode on a transparent electrically conducting substrate 23 upon which incoming radiation 17 is incident, scattering losses of the incoming radiation due to the electrolyte 16 are eliminated. O-rings 24 enable the structure to be clamped together to prevent loss of electrolyte.

Figure 3:
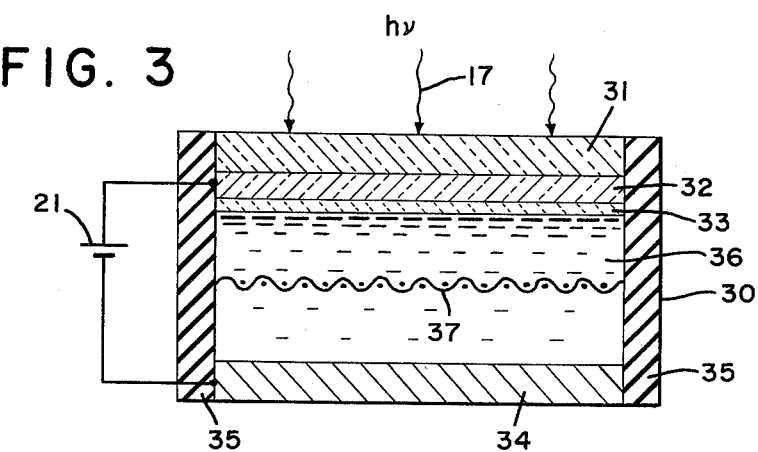
FIG. 3 is a cross-sectional view of an embodiment of the invention, utilizing flowing electrolyte and one thin film semiconducting electrode illuminated from one direction.

FIG. 3 depicts a cross sectional view of a rectangular pipe 30 which is the essential element of a continuous flow photoelectrolysis cell containing an n-type (or p-type) thin film semiconducting electrode and a metallic counter-electrode. The top 31 of the pipe consists of glass, which is coated on the inside with transparent, electrical conductor 32 upon which an electrode 33, comprising at least one thin film semiconducting layer, is deposited. The bottom 34 of the pipe is metallic and comprises the counter-electrode. The electrode and counter-electrode are isolated from each other by insulating material 35 which comprises the sides of the pipe. Liquid electrolyte 36 flows through the cell, and $O_2$ and $H_2$ are formed at electrode 33 and counter-electrode 34, respectively, as solar radiation 17 is absorbed in the semiconducting layer of electrode 33. The generated gases are prevented from mixing by a separator 37 which permits liquid transport but not gas transport. This separator may consist of fritted glass or a membrane material, for example. An external electrical bias 21 is provided as needed to control evolution. The evolved gases are swept along with the electrolyte flow in their respective compartments, and, at the exit of the pipe, the gases are separated from the electrolyte by conventional methods.

Figure 4:
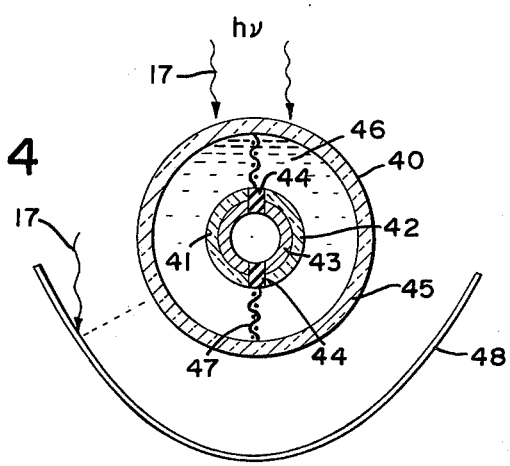
FIG. 4 is a cross-sectional view of an alternative embodiment of the invention, utilizing flowing electrolyte and two thin film semiconducting electrodes illuminated from all directions.

FIG. 4 depicts a cross-sectional view of a circular pipe structure 40 which comprises the essential element of a continuous flow photoelectrolysis cell comprising anode 41 and cathode 42 which comprise at least one n-type thin film and at least one p-type thin film, respectively. The electrodes are simultaneously illuminated, using solar concentration techniques. The n- and p-type thin films are deposited on each half circle of a split metallic tube 43 and are separated from each other by a small insulating section 44. The metallic tube is enclosed by a concentric glass pipe 45, and electrolyte 46 flows through the annular space. $O_2$ and $H_2$ are evolved at anode 41 and cathode 42, respectively, and are prevented from mixing by gas separator 47. Solar radiation 17 impinges on all sides of the pipe, as illustrated by the dotted line, with the aid of solar concentrator 48, which may comprise conventional reflectors, such as a parabolic or a flat mirror, for example. $H_2$ and $O_2$ are carried along with the liquid electrolyte and are separated from the liquid at the exit of the pipe by means of conventional gas-liquid separation equipment (not shown). A conventional anodic electrical bias (not shown) between the n- and p-type electrodes is applied as needed to control the rate of $H_2$ and $O_2$ evolution.

Figure 5:
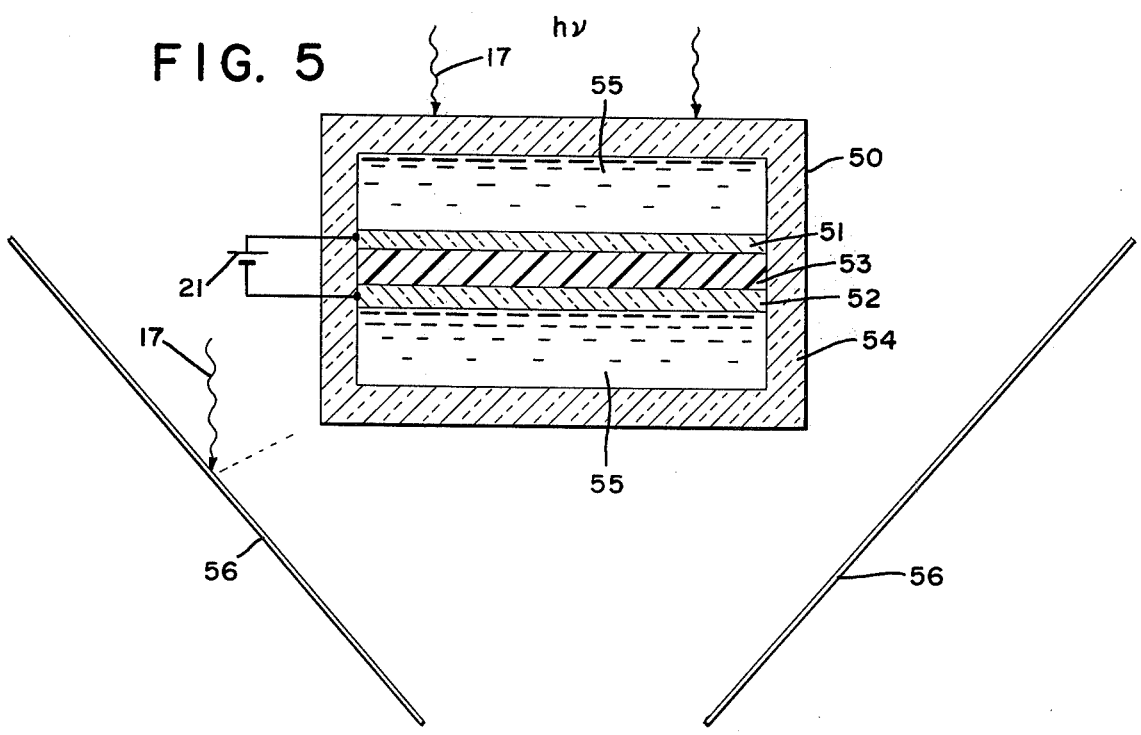
FIG. 5 is a cross-sectional view of an alternative embodiment of the invention, utilizing a thin film solid electrolyte and two thin film semiconducting electrodes illuminated from all directions.

FIG. 5 depicts a cross-sectional view of a totally thin film photoelectrolysis cell 50 comprising anode 51 and cathode 52 which comprise at least one n-type thin film and at least one p-type thin film, respectively. The electrodes are deposited on either side of a thin solid polymer electrolyte sheet 53. The polymer sheet is suspended in a glass pipe 54 which has ordinary water 55 flowing through it in contact with the n- and p-type sides of the polymer sheet. The semiconducting films are sufficiently porous to permit ionic contact between the water and the polymer electrolyte. Solar radiation 17 impinges on the cell and is absorbed in both the n- and p-type semiconducting layers with the aid of solar concentrators 56, which may comprise conventional reflectors, for example. $O_2$ and $H_2$ are produced at the n- and p-type electrodes, respectively, and are collected and separated as described earlier. An anodic electrical bias 21 is applied between the n- and p-type electrodes to control the rate of $O_2$ and $H_2$ evolution. The porous n- and p-type films have sufficient electrical conductivity, about 1 $ohm^{-1} cm^{-1}$, or are supported on electrically conducting porous substrates (not shown) so as to provide good electrical contact between the n- and p-type electrodes.

a. Electrode Material

The selection of electrode material is constrained by two considerations: (1) the minimum bandgap necessary to dissociate water into hydrogen and oxygen (1.23 eV) and (2) the maximum energy available from the sun (4.0 eV). Due to energy losses that may occur, it is preferred that the minimum bandgap be about 1.3 eV. The electrode materials must be stable electrochemically and inert to any reactions in solution. Preferred materials are suitably doped n-type semiconductors such as, $TiO_2$, $In_2O_3$, $SnO_2$, GaAs, GaP, CdS, Si, and the titanates $MTiO_3$, where M is at least one element of barium, strontium, the rare earth elements (atomic number 57 to 71, inclusive) and the transition metal elements (Groups IB through VIIB and VIII of the Periodic Table). Examples of rare earth and transition metal titanates include $LaTiO_3$ and $NiTiO_3$, respectively.

To date, $TiO_2$ is the most useful material developed. However, $TiO_2$ is a wide bandgap material ($E_g = 3.0$ eV), and its principle optical absorption is thus not in that region of the solar spectrum to obtain maximum efficiency for cells employing $TiO_2$ electrodes. For such wide bandgap materials, however, there are methods to increase the efficiency. For example, graded bandgaps or multiple heterojunction semiconduction layers may be utilized, with the bandgap of each layer ranging from about 1.3 to 4.0 eV. This comprises joining together two or more semiconducting materials having different bandgaps such that a greater fraction of the solar irradiance is absorbed. For example, $TiO_2$ combined with CdS, GaP, GaAs, CdTe or Si results in solar absorbances ranging from about 25% to 70%; the solar absorption of $TiO_2$ alone is about 3% to 6%. Furthermore, such combinations permit use of semiconductors which by themselves are not chemically inert with respect to the electrolyte. This is accomplished by overcoating the chemically sensitive semiconductor, such as CdS or GaP, with an inert semiconductor layer, such as $TiO_2$, to protect the chemically sensitive semiconductor from chemical attack by the electrolyte. Also, sensitization of the electrolyte, such as with photosensitive dyes, may be used to increase conversion efficiency. Conventional solar concentrators may be used to further increase conversion efficiency.

While single crystal material may be employed, the electrodes of the invention are in the form of thin films (about 500 A to 10 $\mu$m), and may be either polycrystalline, with a crystallite size ranging from about 25 A to 1 mm, or amorphous. The films are conveniently fabricated by conventional deposition procedures such as DC sputtering, RF sputtering, chemical vapor deposition, thermal evaporation, and anodization or thermal oxidation of metals.

The thin film may be formed on a metal substrate in order to achieve appropriate conductivity to the rest of the circuit. However, in such a situation, radiation must pass through the electrolyte and consequently, scattering losses occur. Alternatively, the thin film may be deposited on a transparent electrical conductor such as $Cd_2SnO_4$ upon which solar radiation impinges to reduce the scattering losses and to increase the efficiency of the cell. Other known transparent conductors include suitably doped $In_2O_3$ and $SnO_2$.

For photoelectrolysis cells of the invention, an external bias may be supplied in order to efficiently generate $H_2$. The amount of bias depends inversely on bandgap, and reflects $O_2$ overvoltage. Bias can be eliminated by employing materials that do not produce $O_2$, such as a semiconducting thin film electrode of CdS. While lower bandgap materials evidence greater conversion efficiency of optical energy to produce $H_2$, a higher bias is required. For a semiconducting thin film electrode of $TiO_2$, the minimum bias ranges from about 0.3 to 0.5 V, depending on electrolyte pH and rate of $H_2$ evolution desired. A bias greater than about 1.7 V is not useful, since this is the voltage employed in a conventional electrolysis cell. Even a bias greater than about 1 V is considered to use too much electrical energy to be competitively useful. Accordingly, an external bias ranging from 0 to about 1 V is preferred. The bias means may be any conventional bias apparatus known in the art that supplies the requisite voltage.

While n-type semiconducting films are generally preferred as the electrode (when the counter-electrode is metallic), p-type semiconducting films may alternatively be employed. P-type semiconducting materials include suitably doped GaAs, GaP, CdTe, CuInS$_2$, InP, ZnSe, Cu$_2$S and Si. The external bias on the electrode then ranges from 0 to about $-1$ V.

B. Counter-Electrode Material

The counter-electrode may be either metallic, such as platinum, or semiconducting. If it is semiconducting, it must be of an opposite conductivity type to the semiconducting electrode in the cell. For n-type thin film semiconducting electrodes, p-type counter-electrodes comprising at least one semiconducting layer, must be used. Examples of p-type semiconducting counter-electrodes include suitably doped GaAs, GaP, CdTe, CuInS$_2$, InP, ZnSe, Cu$_2$S and Si. These materials may be in the form of thin films. Use of semiconducting counter-electrodes requires that the sum of the bandgaps for all photoactive layers of both electrodes be equal to the energy required to dissociate water and to provide for the other energy loss mechanisms previously described, e.g., a total bandgap for both electrodes ranging from about 1.3 to 5.0 eV. Therefore, use of semiconducting counter-electrodes would permit lower bandgap materials to be employed in the cell than would be required for metallic counter-electrodes and would enable both electrodes to be illuminated by solar radiation, thereby increasing conversion efficiency.

C. Electrolyte

The electrolyte must have a sufficiently high conductivity in order to minimize cell resistance and reduce losses. Preferably, the specific conductivity is at least about $10^{-3}$ ohm$^{-1}$-cm$^{-1}$.

The electrolyte conveniently is an aqueous solution made appropriately acidic or basic. Examples include 0.1N KOH and 0.2N H$_2$SO$_4$. Alternatively, a solid polymer electrolyte comprising a cationic or anionic polymeric membrane film may be employed. There are many advantages to using the latter: (1) the thin semiconducting electrode film can be deposited directly onto the polymer electrolyte film, which results in low internal resistance; (2) no free acid or base is present in the cell, which reduces chemical corrosion of the semiconductor electrode; and (3) both the n- and p-type thin film electrodes can be deposited on opposite sides of the polymer electrolyte membrane, which results in a totally thin film photoelectrolysis cell. An example of such a polymer electrolyte is a perfluorniated sulfonic acid polymer (also known as Nafion, a trademark of E. I DuPont de Nemours and Co.) which is available in thicknesses ranging from about 0.005 to 0.015 inch.

For sensitizing wide bandgap electrodes to visible light, photosensitive dyes such as rhodamine B, eosine, or crystal violet may be incorporated in the electrolyte to increase conversion efficiency.

The dependence of the conversion efficiency on semiconductor bandgap is shown in Table II.

Table II.

| Semiconductor Bandgap, eV | Maximum Efficiency, % | H$_2$ Evolution, l$^2$/m$^2$/hr |
|---|---|---|
| 1.0 | 45 | 200 |
| 2.0 | 25 | 42 |
| 3.0 | 8 | 17 |

As noted above, however, the minimum total bandgap required would be 1.23 eV for aqueous systems. Lower bandgap materials may be used if another anodic reaction is substituted for O$_2$ evolution or if simultaneous illumination of n- and p-type semiconducting electrodes is employed.

The efficiencies listed in the Table above are very high compared with those possible by direct photolysis. This is because direct photolysis utilizes only a very small fraction of the available solar spectrum i.e., wavelengths (less than 0.2 $\mu$m). The maximum efficiency will, in practice, be decreased by electron-hole recombination, incomplete absorption and electrode polarization effects. Nevertheless, the use of semiconductor electrodes is the most attractive scheme for the photolytic decomposition of water by solar radiation.

D. Collection of Hydrogen

The collection and storage of hydrogen gas produced by photoelectrolysis is easily accomplished by conventional techniques, such as pressurizable tanks, metal absorption of hydrogen to form reversibly decomposable metal hydrides and the like.

EXAMPLES

1. DC Sputtering

DC sputtering was carried out in a vacuum system consisting of an 18 inch glass belljar, controls for gas composition and pressure regulation and a 4 kV source of DC power.

Thin films of rutile (TiO$_2$) were DC sputtered from a polycrystalline rutile target onto substrates of titanium, zirconium, SnO$_2$ on glass, In$_2$O$_3$ on glass and fused quartz. Film characterization was performed on TiO$_2$ supported on fused quartz substrates, since no intereference existed from the substrate with respect to optical transmittance and electrical conductivity.

The TiO$_2$ sputtering target consisted of a commercially available 4⅛ inch by ¼ inch disc of hot pressed rutile powder. The substrates were suspended above the target with a special copper platform, and the target-to-substrate distance was fixed at 1¼ inch for all experiments. The pressure in the chamber was held at 30 $\lambda$ m of 20% O$_2$-80% Ar. No external heating or cooling was applied to the substrate holders, and the substrate temperature was determined by the sputtering conditions. Sputtering rates were typically about 200 A/hr.

X-ray examination of TiO$_2$ films on metal substrates sputtered at 2.5 kV in 80% argon indicated that on titanium substrates, the film had the rutile structure with a crystallite size of 75 A and a lattice distortion (degree of displacement from normal lattice sites) of 3.5%; on zirconium substrates the film structure was also rutile with a crystallite size of 83 A. The films sputtered onto quartz substrates were amorphous.

Resistivity measurements of TiO$_2$ films sputtered onto quartz substrates alongside the metallic substrates indicate that the conductivity was less than $10^{-6}$ ohm$^{-1}$ cm$^{-1}$. Hence, the TiO$_2$ film was very lightly doped with donor defects. Capacitance measurements on DC sputtered films were found to be independent of bias.

The i-V characteristics of DC sputtered films in contact with electrolyte were qualitatively similar to those observed for TiO$_2$ single crystals. However, one important difference is that these films were subject to a "forming" process which consisted of applying a negative bias to the TiO$_2$ electrode (e.g., −5 V for 10 sec); H$_2$ gas was generally evolved during this period.

Immediately after forming, the photocurrent was increased about 10 fold. The forming process was repeatable in that a formed sample which was aged could be reformed to its maximum photoresponse at any time.

The photoresponse generally followed the absorption edge; it peaked at about 3300 to 3500 A and fell to zero at about 4000 A.

2. RF Sputtering

RF sputtering was conducted in a vacuum system consisting of an 18 inch stainless steel belljar outfitted with a 2 kW RF power supply and matching network.

Films of rutile (TiO$_2$) were RF sputtered from a polycrystalline rutile target onto substrates of titanium, zirconium, In$_2$O$_3$ on glass, and fused quartz. The target consisted of an 8 inch by ¼ inch disc of hot pressured rutile powder which was specially bonded to a water-cooled target plate. The substrates were positioned on a substrate table located beneath the target. The substrate table could be heated up to 650° C with internal heaters, and the distance from the target varied between 1½ to 3 inches.

The gas pressure and composition could be controlled over wide limits. Initial sputtering runs were made at 10 μ m of 10% O$_2$–90% Ar.

Initial runs were made at 1000 watts of RF power, 10% O$_2$–90% Ar, substrate-to-target distance of 2 inches and with the substrate platform heated to temperatures of about 300° to 500° C. Under these conditions, the deposition rate was about 0.35 μ m/hr. This was about 10 times the deposition rate achieved with the DC sputtering unit.

The crystal structure was again pure rutile, with crystalline size and lattice distortion dependent upon substrate temperature. Higher temperatures (520° C) yielded higher crystallite sizes (278 A) and lower lattice distortion (1.9%).

Measurements of the film conductivity (on quartz) and film capacitance (metal-TiO$_2$-electrolyte) again indicated that the TiO$_2$ films had very low conductivity and a large depletion layer width.

The i-V characteristics of the RF sputtered films in contact with electrolyte were in general similar to those of DC sputtered films except that there were differences with respect to the forming effect. Some RF films underwent a forming process similar to that for DC films. However, other RF films showed i-V characteristics which were not significantly improved after a forming operation. These i-V characteristics were stable with time, and gave conversion efficiencies which were about ⅓ those of single crystal TiO$_2$.

3. Thin Films

Thin film electrodes were studied in apparatus similar to that depicted in FIG. 2. The substrate was sealed from the electrolyte with O-rings, and illumination could be made either through the electrolyte (for opaque substrates) or through the transparent electrically conducting substrates (e.g., Cd$_2$SnO$_4$, In$_2$O$_3$, SnO$_2$). In order to evaluate photoelectrolysis as a viable energy conversion scheme, it was necessary to measure the efficiency of conversion of optical energy into chemical energy (i.e., H$_2$). It was necessary to supply an anodic bias to the TiO$_2$ electrode in order to produce H$_2$ evolution. Thus, the balance between the input electrical bias, the inut optical energy and the output chemical energy had to be determined. The optical energy input was measured with a thermopile, the chemical energy output was determined by measuring the H$_2$ evolution rate, and the electrical bias power was calculated from the photocurrent and bias voltage.

For TiO$_2$ films sputtered onto titanium, the following results were obtained showing the H$_2$ evolution rate as a function of anodic bias:

| Film | Input Optical Power, mw (3200–4000 A) | Bias, Volts | H$_2$ Evolution, cc/hr |
|---|---|---|---|
| DC Sputtered, Formed | 11.5 | 1.0 | 0.36 |
|  |  | 0.8 | 0.21 |
|  |  | 0.6 | 0.09 |
| RF Sputtered, Unformed | 18.1 | 1.0 | 0.17 |
|  |  | 0.8 | 0.12 |
|  |  | 0.6 | 0.05 |

The DC sputtered film was formed at −10 V for 10 seconds; the indicated H$_2$ evolution rates decayed with time after forming.

Unformed DC sputtered films had optical conversion efficiencies of about 0.6% (at +1.0 V).

Unformed RF sputtered films had optical conversion efficiencies of about 1.1% (at +1.0 V),

What is claimed is:

1. A photoelectrolysis cell for producing hydrogen from solar radiation comprising
    a. an electrode comprising an outer, chemically inert thin film semiconducting layer supported on at least one inner thin film semiconducting layer of some conductivity type as said outer layer, which is disposed on a supporting conductive substrate, each layer having a bandgap which ranges from about 1.3 to 4.0 eV;
    b. a counter-electrode;
    c. means for retaining an electrolyte disposed between the electrode and the counter-electrode;
    d. external bias means between the electrode and the counter-electrode for biasing the electrode with from 0 to about −1 V; and
    e. means for collecting hydrogen produced.

2. The cell of claim 1 in which the electrode comprises at least one suitably doped n-type composition selected from the group consisting of TiO$_2$, In$_2$O$_3$, SnO$_2$, GaAs, GaP, CdS, Si and MTiO$_3$, where M is at least one element selected from the group consisting of La, Ba, Sr, the rare earth elements and the transition metal elements.

3. The cell of claim 2 in which the electrode comprises an outer layer of n-type TiO$_2$ and an inner layer of at least one n-type composition selected from the group consisting of CdS, GaP, GaAs, CdTe and Si, with the bandgap of each layer ranging from about 1.3 to 4.0 eV.

4. The cell of claim 1 in which the counter-electrode comprises at least one thin film semiconducting layer having a conductivity type opposite so that of the thin film semiconducting electrode and in which the sum of the bandgaps for all photoactive layers of both electrodes ranges from 1.3 to 5.0 eV.

5. The cell of claim 4 in which the counter-electrode comrises a suitably doped p-type composition selected from the group consisting of GaAs, GaP, CdTe, CuInS$_2$, InP, ZnSe, Cu$_2$S and Si.

6. The cell of claim 1 in which the counter-electrode is metallic.

7. The cell of claim 6 in which the electrode comprises at least one n-type semiconducting composition and the bias applied ranges from 0 to about +1 V.

8. The cell of claim 6 in which the electrode comprises at least one p-type semiconducting composition and the bias applied ranges from 0 to about −1 V.

9. The cell of claim 8 in which the electrode comprises at least one suitably doped p-type composition selected from the group consisting of GaAs, GaP, CdTe, CuInS$_2$, InP, ZnSe, Cu$_2$S and Si.

10. The cell of claim 1 in which the substrate comprises a transparent electrically conducting material selected from the group consisting of Cd$_2$SnO$_4$ and suitably doped In$_2$O$_3$ and SnO$_2$.

11. A process for producing hydrogen from solar radiation comprising
   a. exposing to solar radiation an electrode in contact with an electrolyte in turn having a counter-electrode in contact therewith, said electrode comprising an outer, chemically inert thin film semiconducting layer supported on at least one inner thin film semiconducting layer of some conductivity type as said outer layer, said layers being disposed on a supporting conducting substrate, each layer having a bandgap which ranges from about 1.3 to 4.0 eV;
   b. applying a bias between the electrode and the counterelectrode of from 0 to about − 1 V; and
   c. collecting hydrogen produced.

12. The process of claim 11 in which the electrode comprises at least one suitably doped n-type composition selected from the group consisting of TiO$_2$, In$_2$O$_3$, SnO$_2$, GaAs, GaP, CdS, Si and MTiO$_3$, where M is at least one element selected from the group consisting of La, Ba, Sr, the rare earth elements and the transition metal elements.

13. The process of claim 12 in which the electrode comprises an outer layer of n-type TiO$_2$ and an inner layer of at least one n-type composition selected from the group consisting of CdS, GaP, GaAs, CdTe and Si, with the bandgap of each layer ranging from about 1.3 to 4.0 eV.

14. The process of claim 12 in which the counterelectrode comprises at least one thin film semiconducting layer having a conductivity type opposite to that of the thin film semiconducting electrode and in which the sum of the bandgaps for all photoactive layers of both electrodes ranges from about 1.3 to 5.0 eV.

15. The process of claim 14 in which the counter-electrode comprises at least one suitably doped p-type composition selected from the group consisting of GaAs, GaP, CdTe, CuInS$_2$, InP, ZnSe, Cu$_2$S and Si.

16. The process of claim 11 in which the counter-electrode is metallic.

17. The process of claim 16 in which the electrode comprises at least one n-type semiconducting composition and the bias applied ranges from 0 to about +1 V.

18. The process of claim 16 in which the electrode comprises at least one p-type semiconducting composition and the bias applied ranges from 0 to about −1 V.

19. The process of claim 18 in which the electrode comprises at least one suitably doped p-type composition selected from the group consisting of GaAs, GaP, CdTe, CuInS$_2$, InP, ZnSe, Cu$_2$S and Si.

20. The process of claim 11 in which the substrate comprises a transparent electrically conducting material selected from the group consisting of Cd$_2$SnO$_4$ and suitably doped In$_2$O$_3$ and SnO$_2$.

21. The process of claim 11 in which the electrolyte comprises an aqueous solution having a specific conductivity of at least about $10^{-3}$ ohm$^{-1}$cm$^{-1}$.

22. The process of claim 11 in which the electrolyte comprises a solid polymer electrolyte having a specific conductivity of at least about $10^{-3}$ ohm$^{-1}$cm$^{-1}$.

23. The process of claim 11 in which the electrolyte includes a photosensitive dye.

* * * * *

UNITED STATES PATENT AND TRADEMARK OFFICE
CERTIFICATE OF CORRECTION

PATENT NO. : 4,011,149
DATED : March 8, 1977
INVENTOR(S) : Arthur Jack Nozik

It is certified that error appears in the above-identified patent and that said Letters Patent are hereby corrected as shown below:

Col. 4, line 61 "h$\mu$" should be -- h$\nu$ --.
Col. 5, line 8, insert a space between "about" and "0.2".
Col. 6, line 27, "h$\mu$" should be -- h$\nu$ --.
Col. 7, line 42, after the word "with" insert -- both --.
Col.10, line 4, "1$^2$/m$^2$/hr" should be -- 1/m$^2$/hr --.
Col.10, line 18, before "i.e.", insert -- ( --.
Col.10, line 18, before "less", remove the -- ( --.
Col.10, line 43, "interef-" should be -- interf --.
Col.10, line 52, "$\lambda$ m" should be -- $\mu$m --.
Claim 1a, line 39, "some" should be -- same --.
Claim 1d, line 48, "-1 V" should be -- ±1 V --.
Claim 4, line 65, "so" should be -- to --.
Claim 4, line 68, after "from" insert -- about --.
Claim 11a, line 30, "some" should be -- same --.
Claim 11b, line 36, "-1 V" should be -- ±1 V --.
Claim 21, line 37, "10$^-$3 ohm$^-$1cm$^-$1" should read -- $10^{-3}$ ohm$^{-1}$cm$^{-1}$ --.

UNITED STATES PATENT OFFICE
CERTIFICATE OF CORRECTION

Patent No. 4,011,149      Dated March 8, 1977

Inventor(s) Arthur Jack Nozik      Page 2 of 2

It is certified that error appears in the above-identified patent and that said Letters Patent are hereby corrected as shown below:

Claim 22, line 40, "$10^{-3}$ ohm$^{-1}$cm$^{-1}$" should read

-- $10^{-3}$ ohm$^{-1}$cm$^{-1}$ --.

Signed and Sealed this

Thirty-first Day of May 1977

[SEAL]

Attest:

RUTH C. MASON
*Attesting Officer*

C. MARSHALL DANN
*Commissioner of Patents and Trademarks*